United States Patent Office 3,238,042

Patented Mar. 1, 1966

3,238,042

PROCESS FOR PREPARING A PLANOGRAPHIC PRINTING PLATE

Fritz Uhlig, Wiesbaden-Biebrich, Germany, assignor, by mesne assignments, to Azoplate Corporation, Murray Hill, N.J.

No Drawing. Filed Nov. 12, 1964, Ser. No. 410,743
Claims priority, application Germany, Aug. 20, 1960, K 41,516
5 Claims. (Cl. 96—33)

This application is a continuation-in-part of application Serial No. 127,798, filed July 31, 1961, now abandoned.

The present invention relates to a process for preparing a planographic printing plate, and more particularly to a process wherein an oleophilic lacquer is applied for reinforcing the printing image of a planographic printing plate. More particularly, the invention refers to a process wherein a planographic printing plate is obtained by the application of a thin light-sensitive reproduction coating comprising at least one compound of ortho-naphthoquinone diazide structure to a supporting base material of aluminum.

Pre-sensitized reproduction materials for making planographic printing plates which comprise a substance of o-naphthoquinone diazide structure are well known, they are described, e.g. in U.S. patent specifications Nos. 3,046,110 to 112, 3,046,114 to 116, 3,046,120, 3,046,121, 3,046,123, 3,046,124, 3,050,387, 3,130,049 and 3,106,465. The latter describes a material which yields printing plates meeting the most exacting conditions, and this material is preferably used in combination with the present invention.

As is known, the image-wise exposure to suitable radiation effects a differentiation of solubility characteristics in a reproduction coating of the kind described in the just mentioned specifications, so that the non-image parts, i.e. the parts struck by the radiation become soluble in a weakly alkaline aqueous solution, such as dilute trisodium phosphate solution, and the coating in the non-image parts may be dissolved away upon development with such alkaline solution, in contradistinction to those parts of the reproduction coating that were not struck by the radiation and upon development with such alkaline solution remain on the metallic base. In a known process which is based on this differentiation the image resulting after development, having oleophilic properties, is inked up with greasy ink and printing is effected from the resulting inked-up printing surface. The image-free parts have hydrophilic character and repel the greasy ink. It is common practice to further wipe over the inked-up printing surface with a dilute aqueous solution of a water-soluble colloid, e.g. gum arabic, carboxymethyl cellulose, dextrin, or alginic acid.

This known process for the preparation of a planographic printing plate from a so-called pre-sensitized printing plate has the disadvantage that the oleophilic image parts are very thin and, therefore, very delicate, from a mechanical standpoint. In printing, therefore, runs of only moderate length can be obtained. This disadvantage is adherent to planographic printing plates of all kinds.

Attempts have been made to overcome this disadvantage of planographic printing plates by treatment of the developed image, before it is inked up with greasy ink, with lacquer emulsions which in the aqueous phase thereof contain a thickening agent and, in the organic phase, vinyl chloride interpolymers. Another proposal is the use of epoxy compounds in the organic phase. These known lacquering processes for improving planographic printing plates are not very satisfactory, as the emulsions have the disadvantage that they are not sufficiently adherent and are too friable or have inadequate film-forming properties. Due to their aqueous phases the lacquer emulsions attack the reproduction stencils only slightly and the resins contained in the organic phase of the lacquer emulsion are therefore unevenly deposited thereon.

The lacquer emulsions have the further disadvantage that when stored under varying climatic conditions they frequently separate out into aqueous and non-aqueous phases and the dyestuffs or the synthetic resins contained therein tend to precipitate on the bottom of the storage vessels. Moreover, such lacquer emulsions can be applied without streaking only to smaller size printing plates. Therefore, printing plates for large-offset printing are generally treated with lacquers containing organic solvents only. The known solvent-type lacquers and process of their application, however, are unsatisfactory, because the deposits of lacquer resin either adhere inadequately to the image or they are too friable or have inadequate film-forming properties and, therefore, do not give adequate printing runs.

The present invention provides a new process for preparing a planographic printing plate when made from the above defined pre-sensitized printing plate and by the above defined illumination, developing, inking up and wiping over. The process of the invention comprises the steps of treating the inked up and wiped over printing surface with a lacquer comprising an organic liquid which is capable of dissolving the inked up image parts of the printing surface, at least one vinyl chloride interpolymer containing carboxyl groups, and, if desired, one or more dyestuffs and one or more plasticizers, drying the surface and washing it with water. In the process, the treatment with the lacquer results in a dissolution of the inked up image parts of the printing surface, their removal from the metallic base, and their substitution by the lacquer or, finally, after the drying and washing steps, by the resinous body of the lacquer.

The organic liquid may be an organic solvent or a mixture of two or more organic solvents. Examples of organic solvents which are suitable in the lacquer used in the process of the invention are: ketones such as methyl-isobutyl ketone, ethyl-methyl-ketone, methyl-propyl-ketone, diisobutyl-ketone, methyl-amyl-ketone, ethyl-amyl-ketone, and cyclohexanone; esters of aliphatic acids with aliphatic alcohols such as amyl acetate, butyl acetate, methyl glycol acetate, ethylene glycol diacetate and ethylene glycol monoacetate, and also partially hydrogenated aromatic hydrocarbons such as tetrahydronaphthalene, and aromatic hydrocarbons such as toluene or xylene.

The lacquer contains, dissolved in the organic liquid, one or more vinyl chloride interpolymers containing carboxyl groups. Examples are: interpolymers obtained by the co-polymerization of vinyl chloride, vinyl esters of fatty acids such as acetic acid, propionic acid and butyric acid, and also a small proportion of one or more unsaturated monocarboxylic acids such as crotonic acid, cinnamic acid, or unsaturated dicarboxylic acids such as maleic acid, fumaric acid and itaconic acid. Products of this type are commercially available. The application of lacquers containing interpolymers of 80–90% by weight of vinyl chloride, 9–19% by weight of vinyl acetate, and 0.5–2.0% by weight of maleic anhydride has proved to be very advantageous in the process of the invention.

Preferably, in the process of the invention, a lacquer is applied which also contains one or more than one dyestuff soluble in the organic liquid, for instance one of the dyestuffs known as dispersion dyestuffs, e.g. Pigment Red B, Rhodamine B, Oil Scarlet G, Litholrubin, Pure Blue, Oil Red A, Fast Scarlet, Sudan Black, and Ceres Red.

(Color indices: 12,070, 45,170, 26,100, 15,850, 42,755, 26,100, 23,500, 26,150, 45,380, respectively.)

As already mentioned, a plasticizer may also be present in the lacquer used in the process of the invention. A great variety of plasticizers are suitable, e.g. phthalic acid esters, such as phthalic acid diethyl ester or phthalic acid dimethyl ester.

The process of the invention may be, as an example, performed as follows: a foil of aluminum coated with a light-sensitive compound of o-naphthoquinone-diazide structure is illuminated through a master and then treated with a weakly alkaline developing solution such as a dilute trisodium phosphate solution, so that the coating in the non-image parts is dissolved away. The excess of developer is doctored off or removed by rinsing with water. The image parts are then inked up with greasy ink; the non-image parts do not accept ink. The entire image side of the printing foil is then wiped over with a dilute aqueous solution of a water-soluble colloid (e.g. gum arabic, carboxymethyl cellulose, dextrin, or alginic acid), as is normally done in the printing industry when plates are to be stored. While the foil is still moist with the adhering colloid solution, or after the foil has been dried, an appropriate quantity of a lacquer as defined above is poured onto the coated surface of the foil and distributed over the entire surface in continuous movements by means of, for example a cotton pad, a cellulose sponge, or a polyurethane sponge. The lacquer dissolves away the ink and the image parts, and the resin which is contained in the lacquer and which is colored, if a dyestuff had been in the lacquer, adheres extremely tenaciously to the previously imaged parts of the aluminum surface of the printing plate, while in the image-free "gummed" parts there is no essential adhesion of the lacquer. The foil is then dried at room temperature or at elevated temperatures, advantageously by means of a hot air current, or in a drying cabinet, and then vigorously sprayed with water. This causes the lacquer to flake off in the image-free parts while it adheres tenaciously in the image parts. As the result, a visible and, if a dyestuff had been added, deeply colored image is obtained on the printing foil. When the printing foil is set up in a printing machine, a great number of prints can be prepared in the conventional manner.

The invention will be further illustrated by reference to the following examples, in which percents and parts are intended to be by weight.

*Example 1*

2 g. of the 2,3,4-trihydroxy-benzophenone-naphthoquinone-(1,2)-diazide-(2)-5-sulfonic acid ester are dissolved in 100 cc.[3] of glycolmonomethylether. Then a mechanically roughened aluminum foil is coated with the filtered solution and the coating is dried by means of hot air.

For the production of a printing plate, the coated surface of the foil is exposed to actinic light under a pattern and then wiped over with a cotton swab which had been soaked in a solution of about 1.5% trisodium phosphate until a yellow colored image of the pattern is clearly visible. The imaged surface is rinsed with water and inked up with greasy printing ink. Then the inked up image side is wiped over with a cotton swab which had been soaked in a 1% phosphoric acid solution containing gum arabic. Thereafter, a lacquer composed of

| | Parts |
|---|---|
| Amyl acetate | 35 |
| Methylglycol acetate | 41 |
| Cyclohexanone | 15 |
| Interpolymer | 7.5 |
| Sudan Red dyestuff | 0.3 |
| Phthalic acid diethyl ester | 0.5 |

is poured onto the image surface of the foil and distributed over the entire surface in continuous movements by means of a cotton pad. The lacquer dissolves away the ink and the image parts of the original light-sensitive coating, and the colored resin which is contained in the lacquer adheres extremely tenaciously to the previously imaged parts of the aluminum surface of the printing foil, while in the image-free "gummed" parts there is no essential adhesion. The plate is dried by means of a hot air current and then sprayed vigorously with water. This causes the lacquer to flake off in the image-free parts while it continues to adhere tenaciously to the image parts.

In the above lacquer composition, the interpolymer contains, in the polymerised state, 85% of vinyl chloride, 14% of vinyl acetate, and 1% of maleic acid; it is dissolved in the solvent mixture, with stirring, and then the dyestuff and the phthalic acid diethyl ester are added.

*Example 2*

The presensitized printing plate of Example 1 is illuminated, developed, inked up and wiped over with a gum arabic solution as described in Example 1. Thereafter, the plate is dried with hot air and a lacquer composed of

| | Parts |
|---|---|
| Ethyl acetate | 60 |
| Butyl acetate | 20 |
| Cyclohexyl acetate | 20 |
| Interpolymer | 14 |
| Oil Red A | 0.3 |
| Dimethyl benzophenone | 0.1 |

is applied. Further processing of the plate is as described in Example 1.

The interpolymer contains, in a polymerized state, 86% of vinyl chloride, 13% of vinyl acetate, and 1% of carboxylic acid.

*Example 3*

The procedure of Example 1 is repeated using a lacquer having the following composition:

| | Parts |
|---|---|
| Amyl acetate | 35 |
| Ethyl glycol acetate | 41 |
| Methyl-isobutyl ketone | 10 |
| Tetralin | 5 |
| Interpolymer (as in Ex. 1) | 10 |
| Pure Blue | 0.5 |
| Phthalic acid diethyl ester | 0.5 |

The interpolymer is dissolved in the solvent mixture, with stirring, and then the dyestuff and the phthalic acid diethyl ester are added.

*Example 4*

The procedure of Example 1 is repeated, using a lacquer having the following composition:

| | Parts |
|---|---|
| Amyl acetate | 35 |
| Cyclohexanone | 15 |
| Di-isobutyl ketone | 15 |
| Butyl acetate | 15 |
| Interpolymer (as in Ex. 2) | 8 |
| Litholrubin dyestuff | 0.3 |

It will be obvious to those skilled in the art that many modifications may be made within the scope to the present invention wtihout departing from the spirit thereof, and the invention includes all such modifications.

What is claimed is:

1. A process for preparing a planographic printing plate from a presensitized printing plate comprising a base of aluminum and a light-sensitive coating on said base comprising at least one compound of o-naphthoquinone diazide structure by illumination of said light-sensitive coating through a master, developing the illuminated coating with a weakly alkaline aqueous developing liquid, inking up the developed coating with greasy ink to obtain an inked-up printing surface, and wiping over the inked-up printing surface with a dilute aqueous solution of a water-soluble colloid, said developing dissolving away the light-sensitive coating in the non-image parts of the illuminated coating, in said inking up the image parts of the developed coating accept and the non-image parts do not accept ink, which process comprises the steps of treating said inked-up and wiped over printing surface with a lacquer comprising an organic liquid which is capable of dissolving the inked-up image parts of the printing surface, and at least one vinyl chloride interpolymer containing carboxyl groups, drying the surface and washing it with water.

2. A process according to claim 1, in which the lacquer also comprises a dyestuff.

3. A process according to claim 1, in which the lacquer also comprises a plasticizer.

4. A process according to claim 1, in which the organic solvent is selected from the group consisting of ketones, esters of aliphatic acids with aliphatic alcohols, partially hydrogenated aromatic hydrocarbons, and aromatic hydrocarbons.

5. A process according to claim 1, in which the interpolymer is of vinyl chloride with a vinyl ester of a fatty acid.

No references cited.

NORMAN G. TORCHIN, *Primary Examiner.*